United States Patent Office 2,737,975
Patented Mar. 13, 1956

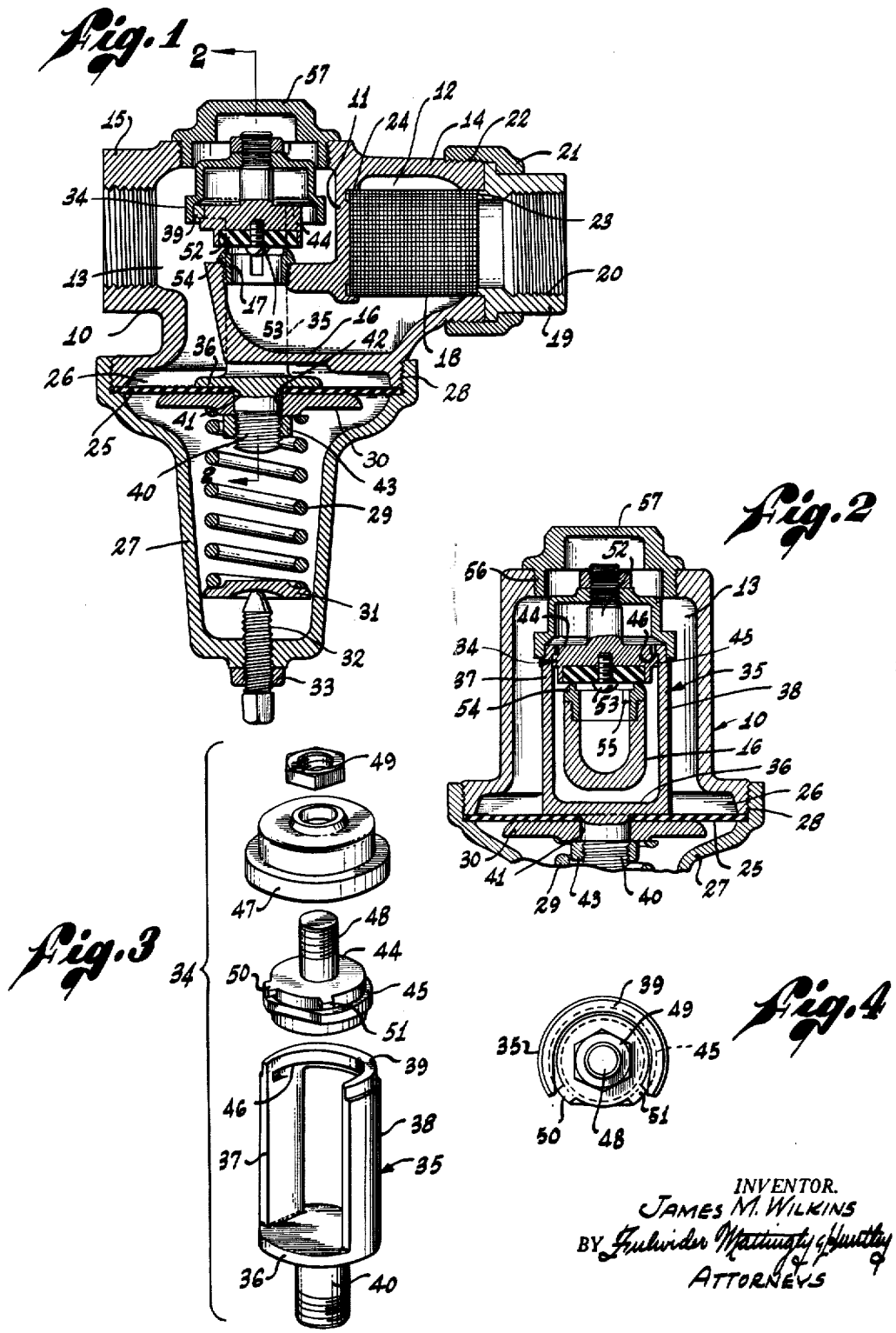

2,737,975

AUTOMATIC PRESSURE REGULATOR AND VALVE MECHANISM THEREFOR

James M. Wilkins, Burbank, Calif., assignor to Arthur H. Kaplan, Los Angeles, Calif.

Application September 9, 1952, Serial No. 308,549

5 Claims. (Cl. 137—505.44)

This invention relates generally to pressure regulators of the diaphragm type and more particularly to one in which the diaphragm carries a yoke which straddles an internal inlet nipple and carries a removable valve member seating on the outlet of said nipple.

A major object is to provide a simple yoke and valve member construction which permits ready and independent access to either the diaphragm or valve parts, and simple repair or replacement without disturbing the opposite parts of the regulator and without removing the regulator from the pipe line in which it is mounted.

Another object of the present invention is an automatic pressure reducing and regulating valve and strainer in which said parts are combined in a unitary housing, the strainer being mounted in a novel manner, in a straight line with the flow with the fluid or gases, to lessen the friction created by fluids and gases passing through it. The foreign substance trapped by the screen, may be removed by simply disconnecting the union coupling nut at the inlet end of the regulator, thus eliminating the need for an extra tapping for the usual cleanout cap, and the supply of such cleanout cap for removal of foreign substance and the screen.

A related object is to provide an automatic regulating valve and cylindrical strainer positioned in line to the inlet and adjacent to the valve regulating mechanism whereby the overall width of the casing as defined by the inlet and outlet ports is reduced to a minimum in the combined housing.

To these and other ends, my invention comprehends further improvements and simplification in construction, all as will be fully described in the accompanying specification, the novel features thereof being set forth in the appended claims.

Figure 1 is a central vertical sectional view of a pressure regulator valve embodying my invention;

Figure 2 is a fragmentray part of a second central vertical sectional view taken at right angles to the view of Figure 1, as indicated by the arrows 2—2 in Figure 1;

Figure 3 is an exploded view of the yoke and valve member assembly; and

Figure 4 is a plan view of the yoke and valve member in assembled relationship.

In Figure 1, the numeral 10 indicates the body portion of the regulator, the interior of which is divided by a partition wall 11 into an elongated strainer chamber 12, and a relatively large valve chamber 13. Lateral branches forming the inlet 14 and the outlet 15 extend from right and left, respectively. A nipple 16 formed integrally with the body portion 10 projects into the valve chamber 13, with which it communicates by an aperture 17, surmounted by a valve assembly 34, which will be described in detail hereinafter.

A cylindrical strainer 18 is supported in the strainer chamber 12, preferably in axial alignment with inlet 14 so as to minimize flow resistance. The inlet 14 is also provided with a tail piece 19, internally threaded at 20 for coupling with an inlet pipe (not shown), the tail piece being coupled to inlet 14 by an assembly nut 21, which threads onto the external threads 22 of inlet 14.

The tail piece 19 includes a retainer flange 23 which extends into the bore of inlet 14 and provides an annular retaining shoulder seat for the upstream end of strainer 18. The downstream end of the strainer 18 seats in an annular groove 24 formed in the upstream face of the vertical partition wall 11. With this arrangement, the strainer 18 is retained securely in place once the assembly nut 21 is tightened upon threads 22. The assembly of the strainer 18 with the tail piece 19 and the assembly nut 21 eliminates the need for a strainer cap and washer usually shown in previously known combined regulator and strainer assemblies.

Circular diaphragm 25 covers a circular opening 26 in the lower part of the valve chamber 13, being clamped in position by a bell-shaped spring housing 27, which threads onto external threads 28 on the body portion 10.

Inside of the spring housing 27, a spring 29 seats at its upper end against an abutment plate 30, which is then held flat against the lower side of the diaphragm 25; the lower end of spring 29 seats in an abutment disc 31, which is supported by an adjustment screw 32 threaded in the bottom of spring housing 27, and having a lock nut 33. It will be seen that if the diaphragm parts need repair or replacement, it may be accomplished by simply unscrewing the housing 27, while the valve assembly 17, or the pipe line in which the regulator is installed, need not be disturbed.

The valve assembly 34 and its assembly relationship with the nipple 16 and the diaphragm 25 are best understood by considering together both Figures 1 and 2, which are sectional views taken at right angles to each other. At the same time, the structure of the component parts of the valve assembly 34 is best seen in the exploded view of Figure 3.

The principal supporting part for the valve assembly 34 is a yoke 35 comprised of a base 36, two upright legs 37 and 38, and a C-shaped portion of a ring 39 surmounting legs 37 and 38 but open at one side to permit assembly over nipple 16 from the diaphragm opening 26. As seen in Figures 1 and 2, the yoke 35 straddles the nipple 16.

The base 36 of the yoke 35 is provided at its underside with a downwardly projecting threaded stud 40, which passes through a hole 41 in the center of the diaphragm 25 and a hole 42 in the center of the abutment plate 30, below which a yoke nut 43 is tightened onto stud 40 so that during operations, the yoke 35 moves integrally with the movement of the diaphragm 25.

The function of the yoke 35 is to carry a valve member 44 to and from closure positions over the downstream aperture 17 of the nipple 16. Valve member 44 is provided at its periphery with an annular flange 45, which seats within the upper part of yoke 35 between the legs 37 and 38, and under an internal annular shoulder 46 formed in the underside of the C-shaped ring 39, as seen in Figures 1 and 2, and in the plan view of Figure 4.

The valve member 44 is machined to let it pass the two ends of the partially open ring 39 when placed on an angle. When it is straightened into alignment with the yoke 35, the two parts fit perfectly together, the counterbore 46 locating the valve member 44 centrally.

When assembled, the valve member 44 is immovably held in the upper end of the yoke 35 by a recessed plate fitting or cap 47, which threads onto a threaded stud 48, projecting from the upper side of the valve member 44. A lock nut 49 threads onto the stud 48 over the cap 47.

Valve member 44 is also provided with a pair of lugs 50 and 51, above the flange 45 and located to abut the open ends of the C-shaped ring 39, and thereby prevent rotation of the valve member 44 when the cap 47 or the lock nut 49 are tightened.

Preferably, valve member 44 is recessed on its lower face to receive a suitable valve disc 52, which may be fastened in place by a centrally disposed screw 53. Similarly, the aperture 17 of the nipple 16 is provided with a removable valve seat 54, which is threaded or otherwise suitably secured, preferably with a suitably packed joint to guard against leakage. Preferably, the interior of the valve seat is provided with lugs 55 by means of which the valve seat can be tightened into place or removed from the nipple aperture 17.

The opening 56 in the body 10 above the yoke 35 is provided with a cap 57, preferably threaded and gasketed to give a tight joint. It will be seen that the needs of the valve side may be cared for without the necessity of disturbing any of the rest of the apparatus, since removal of the cap 57 provides ready access to the valve side of the regulator for removal of the valve member 44 from the yoke 35, and valve seat 54 from the threaded aperture 17, for the purposes of repair or replacement.

The above-described construction lends itself very readily to assembly. After the valve seat 54 has been mounted in the nipple aperture 17, the yoke 35 and the diaphragm 25 may be assembled, and placed in the body 10 in proper relation to the nipple 16. The spring housing 27 may then be screwed to the body 10, with the parts assembled in the housing as shown. Then the valve member 44 may be inserted in the yoke through the open top of the body 10, the cap 47 set up, and the diaphragm spring 29 adjusted to give the tension required for the pressure which is being regulated.

The operation of the regulator will be obvious. The diaphragm spring 29 having been set for the pressure to be regulated, the opening and closing of the valve member 44 will be automatic and quickly responsive to changes in pressure, which are sensed by the diaphragm 25. In the form shown, pressure at outlet 15 controls the valve member 44, such outlet pressure being exerted on the upper surface of the diaphragm 25 so as to maintain the valve member closed against the pressure of the diaphragm spring 29, until reduction in pressure on the outlet side permits the spring to move the diaphragm 25, yoke 35, and valve member 44, whereupon fluid from the inlet 14 will flow through the nipple 16 until the pressure at the outlet 15 is again restored, and the valve automatically closed.

I claim:

1. In a pressure regulator, the combination of a body portion having a relatively large open-ended chamber formed at one end to provide a diaphragm seating surface; inlet and outlet openings formed in said body portion, said outlet opening communicating with said chamber, and said inlet opening communicating with a nipple formed integrally with said body portion extending into said chamber, said nipple having a valve seat aperture in its wall directed toward the end of said chamber opposite said diaphragm seating surface; a substantially U-shaped yoke straddling said nipple and having at one end a base portion with a stud thereon, and at its opposite end a non-continuous C-shaped yoke ring having a counterbore forming an inner flange; a diaphragm engaging said base portion and receiving said stud with its edge seated upon said diaphragm seating surface; a housing for holding said diaphragm upon its seat; adjustable biasing means for said diaphragm; a valve member with an outer peripheral flange, said valve member adapted to be placed on an angle through the open ends of the C-shaped ring and straightened into position on said inner flange of the ring, the counterbore in said ring locating the valve member centrally, and two lugs on said valve member adapted to abut the open ends of the ring to prevent rotation of the valve member; means comprising a threaded stud on the valve member, a recessed plate fitting over said yoke ring and valve member, said threaded stud passing through said recessed plate, and a nut on said threaded stud for retaining said valve member in said yoke ring.

2. In a pressure regulator, the combination of a body portion having a relatively large open-ended chamber formed at one end to provide a diaphragm seating surface; inlet and outlet openings formed in said body portion, said outlet opening communicating with said chamber, and said inlet opening communicating with a nipple formed integrally with said body portion extending into said chamber, said nipple having a valve seat aperture in its wall directed toward the end of said chamber opposite said diaphragm seating surface; a substantially U-shaped yoke straddling said nipple and having at one end a base portion and at its opposite end a non-continuous generally C-shaped yoke ring, the latter being formed with an inner flange; a diaphragm engaging said base portion; a housing for holding said diaphragm upon its seat and adjustable biasing means for said diaphragm; a valve member with an outer peripheral flange, said valve member being adapted to be placed on an angle through the open ends of said C-shaped yoke ring and straightened into position on said inner flange of the ring; means on said valve member adapted to abut the ring to prevent rotation of the valve member; and means comprising a threaded stud on the valve member, a recessed plate fitting over said yoke ring and valve member, said threaded stud passing through said recessed plate, and a nut on said threaded stud for retaining said valve member in said yoke ring.

3. In a pressure regulator, the combination of a body portion having a relatively large open-ended chamber formed at one end to provide a diaphragm seating surface; inlet and outlet openings formed in said body portion, said outlet opening communicating with said chamber, and said inlet opening communicating with a nipple formed integrally with said body portion extending into said chamber, said nipple having a valve seat aperture in its wall directed toward the end of said chamber opposite said diaphragm seating surface; a substantially U-shaped yoke straddling said nipple and having at one end a base portion and at its opposite end a non-continuous generally C-shaped yoke ring, the latter being formed with an inner flange; a diaphragm engaging said base portion; a housing for holding said diaphragm upon its seat and adjustable biasing means for said diaphragm; a valve member with an outer peripheral flange, said valve member being adapted to be placed on an angle through the open ends of said C-shaped yoke ring and straightened into position on said inner flange of the ring; means on said valve member adapted to abut the ring to prevent rotation of the valve member; and means for retaining said valve member in said yoke ring.

4. In a pressure regulator, the combination of a body portion having a relatively large open-ended chamber formed at one end to provide a diaphragm seating surface; inlet and outlet openings formed in said body portion, said outlet opening communicating with said chamber, and said inlet opening communicating with a nipple formed integrally with said body portion extending into said chamber, said nipple having a valve seat aperture in its wall directed toward the end of said chamber opposite said diaphragm seating surface; a substantially U-shaped yoke straddling said nipple and having at one end a base portion with a stud thereon, and at its opposite end a non-continuous C-shaped yoke ring having a counterbore forming an inner flange; a diaphragm engaging said base portion and receiving said stud with its edge seated upon said diaphragm seating surface; means for holding said diaphragm upon its seat; a valve member with an outer peripheral flange, said valve member adapted to be placed on an angle through the open ends of the C-shaped ring and straightened into position on said inner flange of the ring, the counterbore in said ring locating the valve member centrally, and two lugs on said valve member adapted to abut the open ends of the ring to prevent rotation of the valve member; means comprising a threaded stud on the valve member, a recessed plate fitting over said yoke ring and valve member, said threaded stud passing through said recessed plate, and a nut on said threaded stud for retaining said valve member in said yoke ring.

5. In a pressure regulator, the combination of a body portion having a relatively large open-ended chamber formed at one end to provide a diaphragm seating surface; inlet and outlet openings formed in said body portion, said outlet opening communicating with said chamber, and said inlet opening communicating with a nipple formed integrally with said body portion extending into said chamber, said nipple having a valve seat aperture in its wall directed toward the end of said chamber opposite said diaphragm seating surface; a substantially U-shaped yoke straddling said nipple and having at one end a base portion with a stud thereon, and at its opposite end a non-continuous C-shaped yoke ring having a counterbore forming an inner flange; a diaphragm engaging said base portion and receiving said stud with its edge seated upon said diaphragm seating surface; a housing for holding said diaphragm upon its seat; a threaded post carried by said housing; a helical compression spring interposed between said diaphragm and said post; a valve member with an outer peripheral flange, said valve member being adapted to be placed on an angle through the open ends of said C-shaped yoke ring and straightened into position on said inner flange of the ring; means on said valve member adapted to abut the ring to prevent rotation of the valve member; and means for retaining said valve member in said yoke ring.

References Cited in the file of this patent

UNITED STATES PATENTS

| 1,949,106 | Manneschmidt | Feb. 27, 1934 |
| 2,187,038 | Knudson | Jan. 16, 1940 |
| 2,213,789 | Wilkins | Sept. 3, 1940 |
| 2,259,280 | Wile | Oct. 14, 1941 |
| 2,463,892 | Martin | Mar. 8, 1949 |
| 2,519,805 | Wilkins | Aug. 22, 1950 |
| 2,614,367 | Grosboll | Oct. 21, 1952 |

FOREIGN PATENTS

| 101,689 | Great Britain | 1916 |

Dedication 2,737,975.—*James M. Wilkins*, Burbank, Calif. AUTOMATIC PRESSURE REGULATOR AND VALVE MECHANISM THEREFOR. Patent dated Mar. 13, 1956. Dedication filed Aug. 5, 1963, by the assignee, *Irving Terry, d.b.a. The Wilkins Regulator Company, Los Angeles, Calif. (subject to mortgage to Small Business Administration, Washington, D.C.)*

Hereby dedicates to the public the terminal portion of said patent subsequent to July 29, 1963.

[*Official Gazette September 17, 1963.*]